March 7, 1961

W. F. NIKLAS 2,974,244

ELECTRON DISCHARGE DEVICE

Filed Dec. 3, 1959

INVENTOR.
Wilfrid F. Niklas
BY Francis W. Crotty
Atty.

United States Patent Office 2,974,244
Patented Mar. 7, 1961

2,974,244

ELECTRON DISCHARGE DEVICE

Wilfrid F. Niklas, Park Ridge, Ill., assignor to The Rauland Corporation, a corporation of Illinois Filed Dec. 3, 1959, Ser. No. 857,005

5 Claims. (Cl. 313—65)

This invention pertains to the construction of image converters and is especially directed to the relative configuration of the cathode and anode.

As usually constructed, a modern image converter comprises a photo-emissive cathode which is responsive to incident radiation to develop an electron image for projection upon a viewing screen. The cathode is part of an electron-optical system which also includes a cylindrical focusing electrode having a diameter approximately the same as the diameter of the cathode. An anode is also included in the electron-optical system spaced from the cathode beyond the focus electrode. Usually the anode has a much smaller diameter than the cathode and further has an aperture through which electrons which have been emitted, accelerated and focused in the electron-optical system pass to impact a fluorescent target serving as the viewing screen. It is customary to construct the cathode and frequently the leading portion of the anode which faces the cathode as concentric spherical sections of generally uniform radius and it has been found that the image plane of this electron-optical system, which may be characterized as an electrostatic triode system, is curved in a direction opposite to the curvature of the cathode and anode.

As a theoretical matter, the image plane of such a system, assuming that the anode is not apertured, is generally spherical and the forming of an aperture in the anode, which of course is required to achieve a real image, tends to increase the image distance and effects a flattening of the image plane which is helpful for most applications of the converter. The expression "image distance" as here employed designates the distance along the axis of symmetry from the anode aperture to the image plane.

Experience has also shown, however, that it is not possible in arrangements of this type as previously constructed to achieve the degree of flatness of the image plane that is desired for most installations of the image converter. The desirability of a flat image plane will be appreciated when it is recognized that in normal use, the image converter is employed in conjunction with an external light optical system for utilizing the visual image established on the fluorescent viewing screen of the converter. Light optical systems generally perform best in connection with a flat-plane source. Where the source is a curved plane, there is a loss of definition particularly in the edge portions of the viewing screen and in addition, pin-cushion effects may be encountered. Collectively, these deficiencies are categorized as field curvature distortions which impose unnecessary restrictions on the usefulness and maximum size of the image.

It is an object of this invention, therefore, to provide a new and improved image converter which avoids or minimizes the aforedescribed difficulties of prior devices.

It is a particular object of the invention to provide a novel image converter in which field curvature distortion is greatly minimized.

Another specific object of the invention is to improve the electron-optical system of an image converter, particularly as determined by the relative configuration of the anode and cathode electrodes thereof, to achieve greater freedom from field curvature distortion.

A distinct object of the invention is to improve the electron optical arrangement of an image converter to the end that the image plane of the system is flatter than that attained with electron-optical systems heretofore employed in image converters.

An image converter, constructed in accordance with the invention, comprises an electron-optical system including a photosensitive cathode having a generally spherical emitting surface disposed transversely and substantially coaxial of the axis of an electron-optical path along which electrons emitted from the cathode are projected. An anode is included in the electron-optical system likewise disposed transversely and coaxially of the electron axis and arranged to admit electrons to an image plane symmetrical relative to the electron axis and spaced from the cathode surface beyond the anode. The cathode has a nonuniform radius in that the radius of contiguous sections thereof decreases with the spacing of such sections from the electron axis.

One specific embodiment of the invention contemplates an anode having a surface of revolution of a substantially uniform radius and a cathode emitting surface having a radius which decreases with distance along the cathode surface measured from the electron axis.

The features of the present invention which are believed to be novel are set forth with particularity in the appended claims. The invention, together with further objects and advantages thereof, may best be understood, however, by reference to the following description taken in connection with the accompanying drawings in the figures of which like reference numerals identify like elements, and in which:

Figure 1:
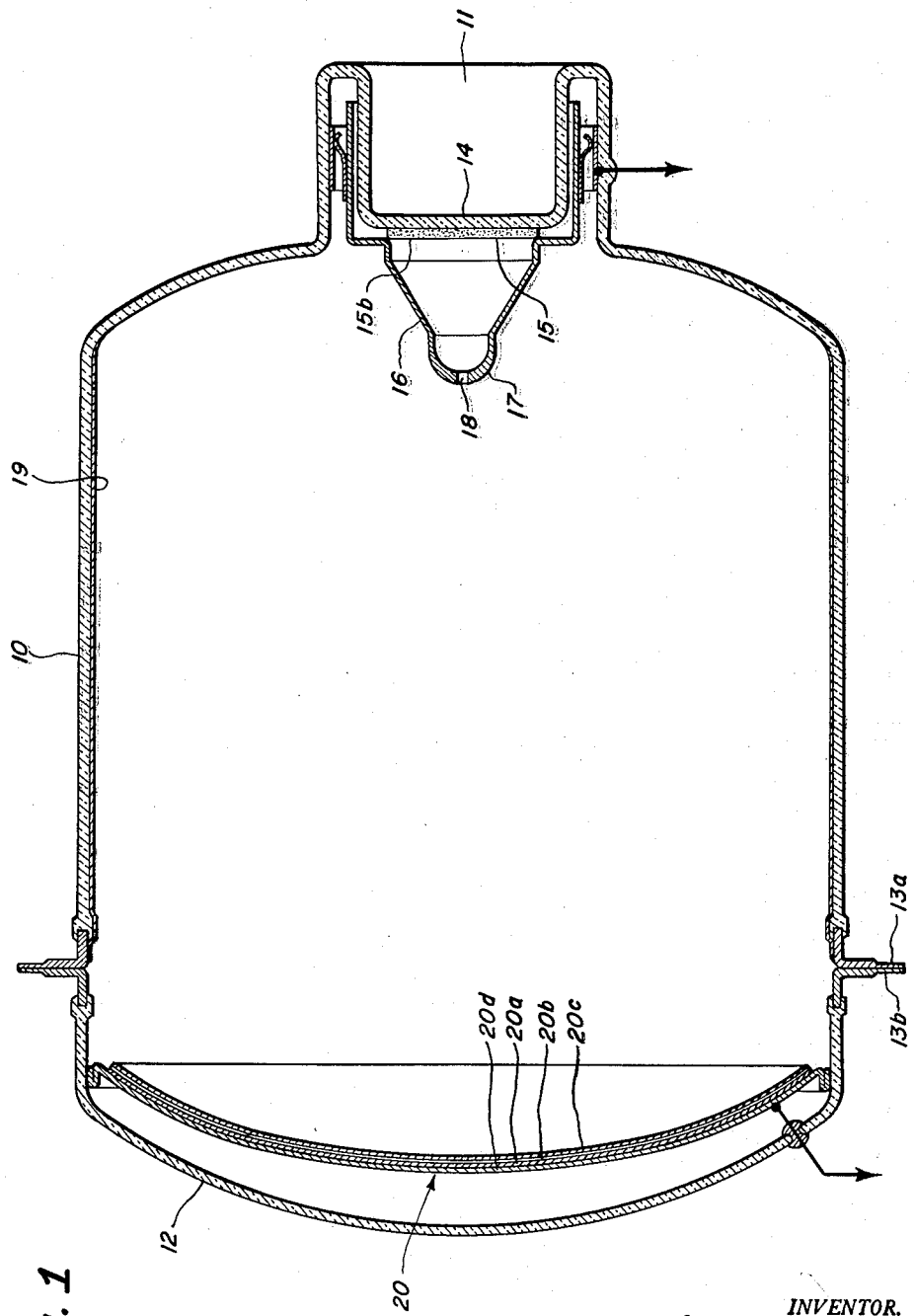
Figure 1 is a cross-sectional view of an X-ray image intensifier embodying this invention.

The image converter represented in Figure 1 comprises a substantially cylindrical glass envelope section 10 having an end portion in the form of a re-entrant press 11 and a substantially spherical glass envelope section 12 of a diameter approximately equal to that of envelope section 10. Envelope sections 10 and 12 are presealed around their entire perimeters to respective metal flanges 13a and 13b which, in turn, are sealed together by heliarc welding or the like after the two envelope sections 10 and 12 have been separately processed.

The re-entrant section 11 is closed by a flat glass plate 14 on the inside of which a suitable fluorescent viewing screen 15 of silver activated zinc-cadmium sulfide or the like is provided. Screen 15 is preferably aluminized or otherwise provided with a conductive metallic backing layer 15b sufficiently thin to be pervious to impinging electrons. An electron-optical system within the tube causes electrons to impinge this screen in order to synthesize a visible image thereon.

The electron-optical system of the image converter includes a photosensitive cathode structure 20 which is generally referred to in the art as a composite multi-layer pick-up screen. This cathode structure is suitably mounted within section 12 of the housing and is generally spherical in configuration. It is positioned transversely of and substantially coaxial of the axis of the tube which corresponds with the axis of an electron-optical path along which electrons emitted from the cathode are projected toward viewing screen 15. The cathode surface as viewed from viewing screen 15 is concave and comprises a support or base member 20d which is transparent to an incident radiation to which the image converter is intended to respond. While devices of the type under consideration may be constructed selectively to respond to radiations of different wavelength, the device illustrated will be assumed to be an X-ray image intensifier and therefore the end portion of envelope section 12 as well as the cathode base member 20d will be constructed of material that is transparent to X-rays. The envelope section may of course be of glass and support 20d may be formed of aluminum. Its thickness is selected to give the required mechanical rigidity to the structure but otherwise the thickness should be of minimal dimension to increase the sensitivity of the device to the incident radiation.

Disposed immediately upon supporting member 20d is an X-ray sensitive phosphor layer 20a such as silver activated zinc sulfide or the like embedded in a suitable silicon resin. A barrier layer 20b which may be of aluminum oxide is superposed over phosphor layer 20a and a photo-emissive layer 20c is placed over the barrier layer. The photo-emissive layer is generally an antimony-cesium composition and constitutes the electron emitting surface of the cathode structure. Aside from the specific configuration of the cathode structure which will be considered in detail hereinafter, this component of the image converter may be entirely conventional both as to its composition and method of manufacture.

A focus electrode 19 is included in the electron-optical system and focuses electrons issuing from the cathode to enter an anode aperture presently to be considered. The focus electrode may conveniently be constructed as a layer of conductive material such as copper or aluminum deposited on the inner portion of cylindrical section 10 of the tube housing. It extends to the metal flange 13a which likewise is conductive to facilitate establishing the focus electrode at a desired operating potential.

The anode 16 of the electron-optical system is likewise disposed transversely and substantially coaxially of the tube and electron-optical axis. The anode structure shown is partially cylindrical and partially conical and has a centrally located aperture 18 provided in a cap or terminating portion 17 which is generally spherical in configuration. Anode aperture 18 provides access for electrons traversing the electron-optical system to an image plane which is symmetrical relative to the tube axis and spaced from the cathode surface beyond the anode surface. Preferably, the image plane corresponds to the greatest extent attainable with viewing screen 15. The anode completely encloses this viewing screen and is electrically connected thereto to maintain the screen at the same electrical potential as the anode. The surface presented by terminating or cap portion 17 of the anode is related in configuration to the facing surface of the cathode in a manner to be considered hereinafter and for a purpose which will also be described.

Lead-in connections of conventional construction are relied upon to establish desired operating potentials for the cathode and the anode. These connections are designated symbolically by the construction lines terminating in arrowheads at the appropriate portions of the image intensifier as represented in Figure 1.

Before considering the cathode and anode configurations in further detail, a brief review will be given of the operation of the described image converter. Normally, the cathode structure 20 is operated at or near electrically ground potential while a positive potential in a range of 25 to 30 kv. is applied to anode 16 and to viewing screen 15. A much smaller positive potential, usually in the order of 500 volts is applied to focus electrode 19. These elements collectively constitute what is known in the art as an electrostatic triode system.

When an X-ray image is directed to end section 12 of the envelope to impinge upon pick-up screen 20 it excites phosphor layer 20a which, in response thereto, emits a corresponding light image. The light image traverses barrier layer 20b and excites photo-emissive layer 20c which, in turn, emits an electron image which is the counterpart of the X-ray image initially received. The focusing and accelerating effects provided by focus electrode 19 and anode 16 cause the electron image to be projected along the optical system and to be focused through anode aperture 18 upon viewing screen 15. At this juncture, the electron image is converted to a visible image which is viewable on screen 15. The reduction in size attributable to the focusing of the image from the cathode surface which is very much larger than the anode and viewing screen surface contributes to a brightness gain.

Figure 2:
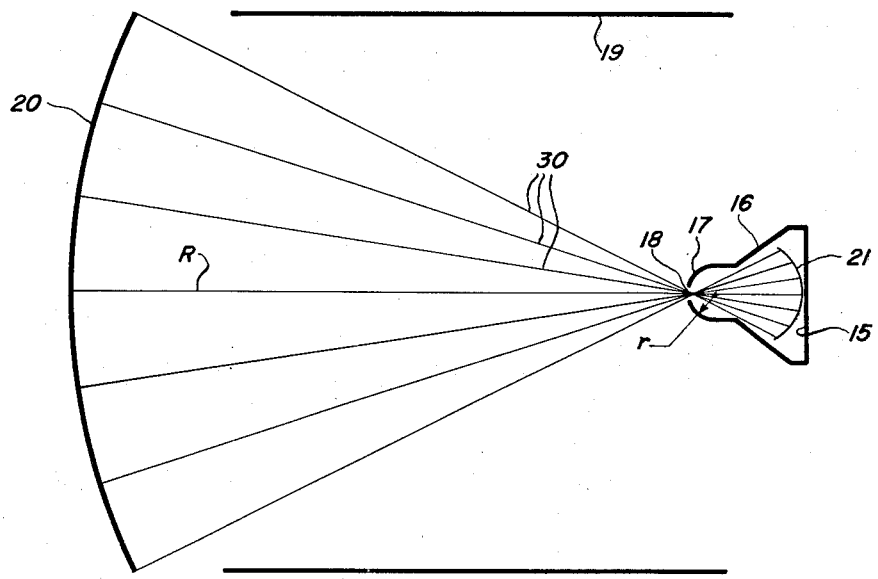
Figure 2 is a schematic representation of the accelerating and focusing system of a prior art image intensifier.

The representation of Figure 2 is a development of the image plane usually resulting from the electrostatic type of triode electron-optical system just described. It assumes cathode 20 to have a constant radius R and further assumes anode cap 17 to have a constant radius r. Where cathode 20 and anode cap 17 are spherical and concentric, as here, with an interposed cylindrical focus electrode having a diameter slightly larger than the maximum diameter of the cathode, electrons emitted from the cathode are focused by the electrostatic field in the manner represented by the construction lines 30, 30. They show that the image plane 21 is curved in a direction opposite to the curvature of the facing surfaces of cathode 20 and anode cap 17. In an ideal system in which the anode and cathode are two spheres and there is no anode aperture present, the image plane is likewise a sphere having the same center of curvature as cathode and anode. Piercing of the anode sphere as required to obtain a real image modifies the image plane, tending to flatten or reduce the curvature of the image plane. However, experience has proven that it is not possible to obtain as flat an image plane as desired if the diameter of the useful cathode area is essentially the same as the diameter of the focus electrode. It has been discovered that the desired condition of a flat image plane may be much more closely approached through shaping of the facing anode and cathode surfaces either singly or in combination in a manner to be described than has heretofore been attained in converter tube structures wherein the facing anode and cathode surfaces are usually sections of concentric spheres of uniform diameter.

Figure 3:
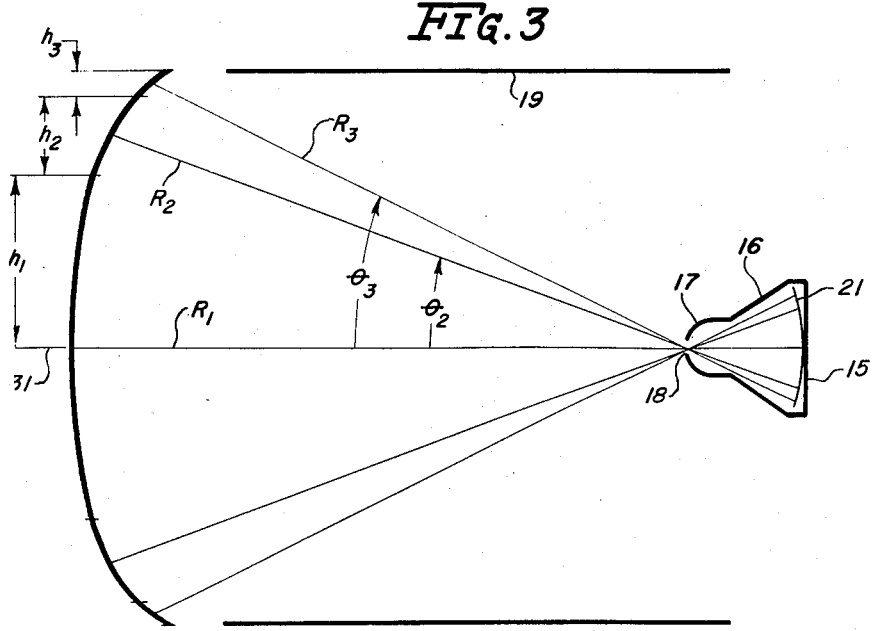
Figure 3 is a schematic representation of the accelerating and focusing system of an image intensifier embodying this invention.

In brief, the desired result is achieved by arranging that the facing surfaces of the cathode and anode be appropriate sectors of concentric spheres of such configuration that the ratio of their radii changes in the direction of unity as measured at increasing angles relative to the electron-optical axis which, as pointed out above, corresponds to the physical axis of the tube. Referring to Figure 3, the criterion of shaping these surfaces is more clearly depicted by the use of designations of angle and radius and by exaggeration merely to emphasize that certain sections of the cathode have a modified radius compared with the remaining sections. The condition depicted is that in which anode segment 17 has a substantially constant radius while the radius of the cathode is varied. More specifically, the cathode surface is symmetrical in respect of the electron optical axis 31 and is formed of a succession of contiguous sections individually having a uniform radius. That portion of the first or innermost segment which is on one side of axis 31 is represented by dimension line $h_1$ and its radius is represented $R_1$. The corresponding portion of the next and contiguous section is designated by dimension line $h_2$ and has a radius $R_2$; and the final one of the three section cathode structure represented in this figure is shown by dimension line $h_3$ having a radius $R_3$. The angles at which radii $R_2$ and $R_3$ are represented are identified $\theta_2$ and $\theta_3$, respectively and the radius of the successive sections, successive in the sense of increasing angles of $\theta$, is reduced to the end that the ratio of the radii of the cathode and anode surfaces changes in the direction of unity with increasing values of $\theta$. In particular, radius $R_3$ is less than radius $R_2$ which in turn is less than radius $R_1$ of the innermost segment of the cathode structure.

The effect of modifying the ratio of the radii as thus described is appreciated when it is understood that the distance from the center of anode aperture 18 to image plane 21, as measured along any of the electron paths in the electron-optical system, increases as the ratio of the radius of cathode 20 to the radius of anode cap 17 changes toward unity. With the anode at a constant radius, this distance increases as the radius of successive segments $h_1$, $h_2$, and $h_3$ of the cathode structure decreases where these several segments are at increasing angles from the axis of the electron-optical system as indicated in Figure 3. Accordingly, the image plane is even more flat with this relative configuration of the facing anode and cathode surfaces than is experienced with prior art structures of the type represented in Figure 2.

The desired result of effectively flattening image plane 21 may be achieved by modifying the radius of the cathode surface alone in which case anode sector 17 has a substantially uniform radius, or by employing a cathode surface of fixed radius and shaping anode sector 17 by changing the radius of its curvature, or by modifying the radius of both structural components. The modification of radius may be continuous over either or both of the anode and cathode structures or this ideal condition may be approximated by employing a segmentized structure as described in connection with the representation of Figure 3. Ideally, if anode sector 17 is assumed to have a constant radius, optimum results are achieved if the facing surface of the cathode has a configuration corresponding substantially to an ellipse rotated about its minor axis.

In one physical embodiment of this structure found to provide a materially flatter image plane 21, the following dimensions were employed:

| | Inches |
|---|---|
| Diameter of focus electrode 19 | 9½ |
| Maximum diameter of useful cathode surface | 9 |
| Radius $R_1$ | 12 |
| Height $h_1$ | 2¾ |
| Radius $R_2$ | 10¼ |
| Dimension $h_2$ | 1½ |
| Radius $R_3$ | 7⅝ |
| Height $h_3$ | ½ |
| Distance from anode aperture 18 to viewing screen 15 | 2%2 |
| Diameter of viewing screen 15 | 2 |

The position of viewing screen 15 in relation to the anode aperture is chosen to provide an optimum condition of focus and minimum distortion over the area of the screen. As stated above, for the illustrative embodiment of the invention this distance is 2%2 inches.

The discussion in respect of Figures 2 and 3 was directed particularly to the configuration of the electron emitting surface 20a of the cathode structure and its configuration in relation to that of the facing portion 17 of the anode. The same result may be achieved by the described modification of the cathode surface when using an apertured anode without curved sector 17 as, for example, a cylindrical or conical shaped anode. Since the cathode structure is an assemblage of superposed layers of different materials, it is apparent that the configuration of the emitting surface which is the outermost layer is determined primarily by the configuration of support element 20d. Accordingly, in practicing the invention as a practical matter, the support element 20d of the cathode structure is formed to satisfy the prescribed relation of the radii of the anode and cathode structures. The superposed layers of material will then have the same configuration. It should also be noted in passing that the change in radii of the anode and cathode structures to accomplish flattening of the image plane area is said to be in the direction of unity but this is given merely to show the sense of the change. Actually, the anode surface is very much larger than the facing surface of the cathode and their radii do not in fact approach equality.

While particular embodiments of the present invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An image-converter comprising: an electron-optical system including a photo-sensitive cathode having a generally spherical emitting surface disposed transversely and substantially coaxial of the axis of an electron-optical path along which electrons emitted from said cathode are projected; an anode also included in said system disposed transversely and substantially coaxial of said axis and being arranged to admit electrons to an image plane symmetrical relative to said axis and spaced from said cathode surface beyond said anode; and said cathode having a nonuniform radius in that the radius of contiguous sections thereof decreases with the spacing of said sections from said axis.

2. An image-converter comprising: an electron-optical system including a photo-sensitive cathode having a generally spherical emitting surface disposed transversely and substantially coaxial of the axis of an electron-optical path along which electrons emitted from said cathode are projected; an anode also included in said system, having a generally spherical surface small with respect to and facing that of said cathode, disposed transversely and substantially coaxial of said axis and further having a centrally located aperture for admitting electrons to an image plane symmetrical relative to said axis and spaced from said cathode surface beyond said anode surface; the aforesaid facing surfaces of said cathode and said anode being approximately sectors of concentric spheres of such configuration that the ratio of their radii changes in the direction of unity as measured at increasing angles relative to said axis.

3. An image-converter comprising: an electron-optical system including a photo-sensitive cathode having a generally spherical emitting surface disposed transversely and substantially coaxial of the axis of an electron-optical path along which electrons emitted from said cathode are projected; an anode also included in said system, having a generally spherical surface of substantially constant radius, small with respect to and facing that of said cathode, disposed transversely and substantially coaxial of said axis and further having a centrally located aperture for admitting electrons to an image plane symmetrical relative to said axis and spaced from said cathode surface beyond said anode surface; the aforesaid facing surfaces of said cathode and said anode being approximately sectors of concentric spheres and the radius of said cathode surface decreasing with increasing distance from said axis so that the ratio of the radii of said surfaces changes in the direction of unity as measured at increasing angles relative to said axis.

4. An image-converter comprising: an electron-optical system including a photo-sensitive cathode having an emitting surface disposed transversely and substantially coaxial of the axis of an electron-optical path along which electrons emitted from said cathode are projected; an anode also included in said system, having a generally spherical surface small with respect to and facing said emitting surface of said cathode, disposed transversely and substantially coaxial of said axis and further having a centrally located aperture for admitting electrons to an image plane symmetrical relative to said axis and spaced from said cathode surface beyond said anode surface;

said spherical surface of said anode having a substantially constant radius and said emitting surface of said cathode having a configuration corresponding substantially to an ellipse rotated about its minor axis.

5. An image-converter comprising: an electron-optical system including a photo-sensitive cathode having a generally spherical emitting surface disposed transversely and substantially coaxial of the axis of an electron-optical path along which electrons emitted from said cathode are projected; an anode also included in said system, having a generally spherical surface of substantially constant radius small with respect to and facing that of said cathode, disposed transversely and substantially coaxial of said axis and further having a centrally located aperture for admitting electrons to an image plane symmetrical relative to said axis and spaced from said cathode surface beyond said anode surface; the aforesaid facing surfaces of said cathode and said anode being approximately sectors of concentric spheres and said cathode being formed of a succession of contiguous sections of substantially uniform radius arranged symmetrically relative to said axis with the radius of said sections decreasing with the spacing of said sections from said axis.

References Cited in the file of this patent

UNITED STATES PATENTS

| | | |
|---|---|---|
| 2,189,320 | Morton | Feb. 6, 1940 |
| 2,506,018 | Flory et al. | May 2, 1950 |

FOREIGN PATENTS

| | | |
|---|---|---|
| 657,958 | Germany | Mar. 17, 1938 |

UNITED STATES PATENT OFFICE
CERTIFICATE OF CORRECTION

Patent No. 2,974,244                                March 7, 1961

Wilfrid F. Niklas

It is hereby certified that error appears in the above numbered patent requiring correction and that the said Letters Patent should read as corrected below.

Column 3, line 21, for "silicon" read -- silicone --.

Signed and sealed this 29th day of May 1962.

(SEAL)
Attest:

ERNEST W. SWIDER                                       DAVID L. LADD
Attesting Officer                                          Commissioner of Patents